United States Patent
Rodriguez Bravo et al.

(10) Patent No.: US 10,896,093 B2
(45) Date of Patent: Jan. 19, 2021

(54) SYSTEM REBOOT MAINTENANCE

(71) Applicant: INTERNATIONAL BUSINESS MACHINES CORPORATION, Armonk, NY (US)

(72) Inventors: Cesar Augusto Rodriguez Bravo, Heredia (CR); Kevin Jimenez Mendez, Heredia (CR); Erik Rueger, Ockenheim (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/247,836

(22) Filed: Jan. 15, 2019

(65) Prior Publication Data

US 2020/0226025 A1 Jul. 16, 2020

(51) Int. Cl.
*G06F 11/14* (2006.01)
*G06F 9/4401* (2018.01)

(52) U.S. Cl.
CPC ........ *G06F 11/1417* (2013.01); *G06F 9/4406* (2013.01)

(58) Field of Classification Search
CPC ................... G06F 9/4406; G06F 11/1417
USPC ..................... 713/1, 2; 714/23, 24
See application file for complete search history.

(56) References Cited

U.S. PATENT DOCUMENTS

| | | | | |
|---|---|---|---|---|
| 6,792,556 B1* | 9/2004 | Dennis | ............... | G06F 9/4401 714/36 |
| 8,271,751 B2* | 9/2012 | Hinrichs, Jr. | ....... | G06F 11/1441 707/639 |
| 8,589,733 B2 | 11/2013 | Di Domenico | | |
| 9,015,164 B2 | 4/2015 | Chan | | |
| 9,411,608 B2 | 8/2016 | Preston | | |
| 9,794,110 B2 | 10/2017 | Kraus et al. | | |
| 9,819,538 B2 | 11/2017 | Kludy et al. | | |
| 10,606,704 B1* | 3/2020 | Chepel | ............... | G06F 11/1464 |
| 2007/0088972 A1 | 4/2007 | Srivastava et al. | | |

FOREIGN PATENT DOCUMENTS

EP 17922561 A 6/2007

OTHER PUBLICATIONS

Anturis; Cloud-Based IT Systems Monitoring Made easy and affordable; retrieved from the Internet Dec. 4, 2018; https://anturis.com/; 4 pages.

(Continued)

*Primary Examiner* — Joseph R Kudirka
(74) *Attorney, Agent, or Firm* — Schmeiser, Olsen & Watts; William H. Hartwell

(57) ABSTRACT

A method and system for improving system maintenance is provided. The method includes detecting software applications, associated processes, and associated services being currently executed via a server system. A script describing the software applications, associated processes, and associated services is generated and a server system reboot process is detected. After the reboot process has executed, it is detected that the server system is currently operational and the script is executed. Each software application is associated with processes and services and it is detected if each software application is fully operational. In response, an operation process associated with the server system is executed.

20 Claims, 8 Drawing Sheets

(56) References Cited

OTHER PUBLICATIONS

Appoptics; Server and Infrastructure Monitoring & Application Performance Monitoring; retrieved from the Internet Dec. 4, 2018; https://www.appoptics.com; 3 pages.
Cacti; About Cacti; retrieved from the Internet Dec. 4, 2018; https://www.cacti.net/; 2 pages.
Carlsen, K. et al.; Automatic Restart of a Stopped Process by a Managing Process; IPCOM000103816D; ip.com; Feb. 1, 1993; 3 pages.
Collectd; collectd—The System statistics collection daemon; retrieved from the Internet Dec. 4, 2018; https://collectd.org; 4 pages.
Happyapps; Uptime Monitoring Simplified; retrieved from the Internet Dec. 4, 2018; https://www.happyapps.io/; 6 pages.
IBM; Server Dependent Reboot Process; IPCOM000134129D; ip.com; Feb. 23, 2006; 2 pages.
Incinga; Monitor any Infrastructure and any Application; retrieved from the Internet Dec. 4, 2018; https://icinga.com/; 6 pages.
Microsoft; Microsoft Message Analyzer; retrieved from the Internet Dec. 4, 2018; https://www.microsoft.com/en-us/download/details.aspx?id=44226; 3 pages.
Mitrotik; The Dude; retrieved from the Internet Dec. 4, 2018; https://mikrotik.com/thedude; 2 pages.
Monitis; Performance monitoring for your website and the whole infrastructure behind it; retrieved from the Internet Dec. 4, 2018; 3 pages.
Niagios; Nagios XI—Easy Network, Server Monitoring and Alerting; retrieved from the Internet Dec. 4, 2018; https://www.nagios.com/products/nagios-xi/#benefits; 5 pages.
Observium; Observium; retrieved from the Internet Dec. 4, 2018; http://www.observium.org/; 9 pages.
OP5; OP5 Monitor; retrieved from the Internet Dec. 4, 2018; https://www.op5.com; 2 pages.
OpenNMS; OpenNMS; retrieved from the Internet Jan. 15, 2019; https://opennms.org/en; 5 pages.
Opmanager; Server Monitoring; retrieved from the Internet Dec. 4, 2018; https://www.manageengine.com/network-monitoring/server-monitoring.html; 10 pages.
Paessler; PRTG Network Monitor Freeware; retrieved from the Internet Dec. 4, 2018; https://www.paessler.com/server_monitoring_software; 15 pages.
PandoraFMS; Pandora FMS: the most complete Opsensource monitoring solution; retrieved from the Internet Dec. 4, 2018; https://pandorafms.org/en/; 4 pages.
PCP; Performance Co-Pilot; retrieved from the Internet Dec. 4, 2018; https://pcp.io/; 5 pages.
Solar Winds; SolarWinds Server Health Monitor; retrieved from the Internet Dec. 4, 2018; https://www.solarwinds.com/; 3 pages.
Spiceworks; Connectivity Dashboard; retrieved from the Internet Dec. 4, 2018; https://www.spiceworks.com/free-network-troubleshooting-tool/; 4 pages.
Zabbix; Server Monitoring; retrieved from the Internet Dec. 4, 2018; https://www.zabbix.com; 6 pages.
Zenoss; Software-Defined IT Operations for Hybrid IT Environments; retrieved from the Internet Dec. 4, 2018; 7 pages.

* cited by examiner

SYSTEM REBOOT MAINTENANCE

BACKGROUND

The present invention relates generally to a method for maintaining server system operation after a system reboot process has occurred and in particular to a method and associated system for improving server system technology associated with initializing server system software, associated processes, and associated services for maintaining server system operation after executing a reboot process.

SUMMARY

A first aspect of the invention provides a system maintenance method comprising: detecting, by a processor of a server system, a plurality of software applications being currently executed via said server system; detecting, by said processor, a plurality of processes, associated with a functionality of the plurality of software applications, currently running via the server system; detecting, by the processor, a plurality of services associated with the functionality of the plurality of software applications, currently running via the server system; generating, by the server system, a script describing the plurality of software applications, the plurality of processes, and the plurality of services; detecting, by the processor via a plurality of sensors, the server system executing a reboot process; after the executing the reboot process, detecting, by the processor via the plurality of sensors, that the server system is currently operational; executing, by the processor, the script; associating, by the processor based on the executing the script, each software application of the plurality of software applications with associated processes of the plurality of processes and associated services of the plurality of services; executing, by the processor, each the software application with each process of the associated processes and each service of the associated services; detecting, by the processor, if each the software application is fully operational; and executing, by the processor based on results of the detecting if each the software application is fully operational, an operation process associated with the server system.

A second aspect of the invention provides a computer program product, comprising a computer readable hardware storage device storing a computer readable program code, the computer readable program code comprising an algorithm that when executed by a processor of a server system implements a system maintenance method, the method comprising: detecting, by the processor, a plurality of software applications being currently executed via the server system; detecting, by the processor, a plurality of processes, associated with a functionality of the plurality of software applications, currently running via the server system; detecting, by the processor, a plurality of services associated with the functionality of the plurality of software applications, currently running via the server system; generating, by the server system, a script describing the plurality of software applications, the plurality of processes, and the plurality of services; detecting, by the processor via a plurality of sensors, the server system executing a reboot process; after the executing the reboot process, detecting, by the processor via the plurality of sensors, that the server system is currently operational; executing, by the processor, the script; associating, by the processor based on the executing the script, each software application of the plurality of software applications with associated processes of the plurality of processes and associated services of the plurality of services; executing, by the processor, each the software application with each process of the associated processes and each service of the associated services; detecting, by the processor, if each the software application is fully operational; and executing, by the processor based on results of the detecting if each the software application is fully operational, an operation process associated with the server system.

A third aspect of the invention provides a server system comprising a processor coupled to a computer-readable memory unit, the memory unit comprising instructions that when executed by the computer processor implements a system maintenance method comprising: detecting, by the processor, a plurality of software applications being currently executed via the server system; detecting, by the processor, a plurality of processes, associated with a functionality of the plurality of software applications, currently running via the server system; detecting, by the processor, a plurality of services associated with the functionality of the plurality of software applications, currently running via the server system; generating, by the server system, a script describing the plurality of software applications, the plurality of processes, and the plurality of services; detecting, by the processor via a plurality of sensors, the server system executing a reboot process; after the executing the reboot process, detecting, by the processor via the plurality of sensors, that the server system is currently operational; executing, by the processor, the script; associating, by the processor based on the executing the script, each software application of the plurality of software applications with associated processes of the plurality of processes and associated services of the plurality of services; executing, by the processor, each the software application with each process of the associated processes and each service of the associated services; detecting, by the processor, if each the software application is fully operational; and executing, by the processor based on results of the detecting if each the software application is fully operational, an operation process associated with the server system.

The present invention advantageously provides a simple method and associated system capable of accurately enabling continuity of system operations.

DETAILED DESCRIPTION

Figure 1:
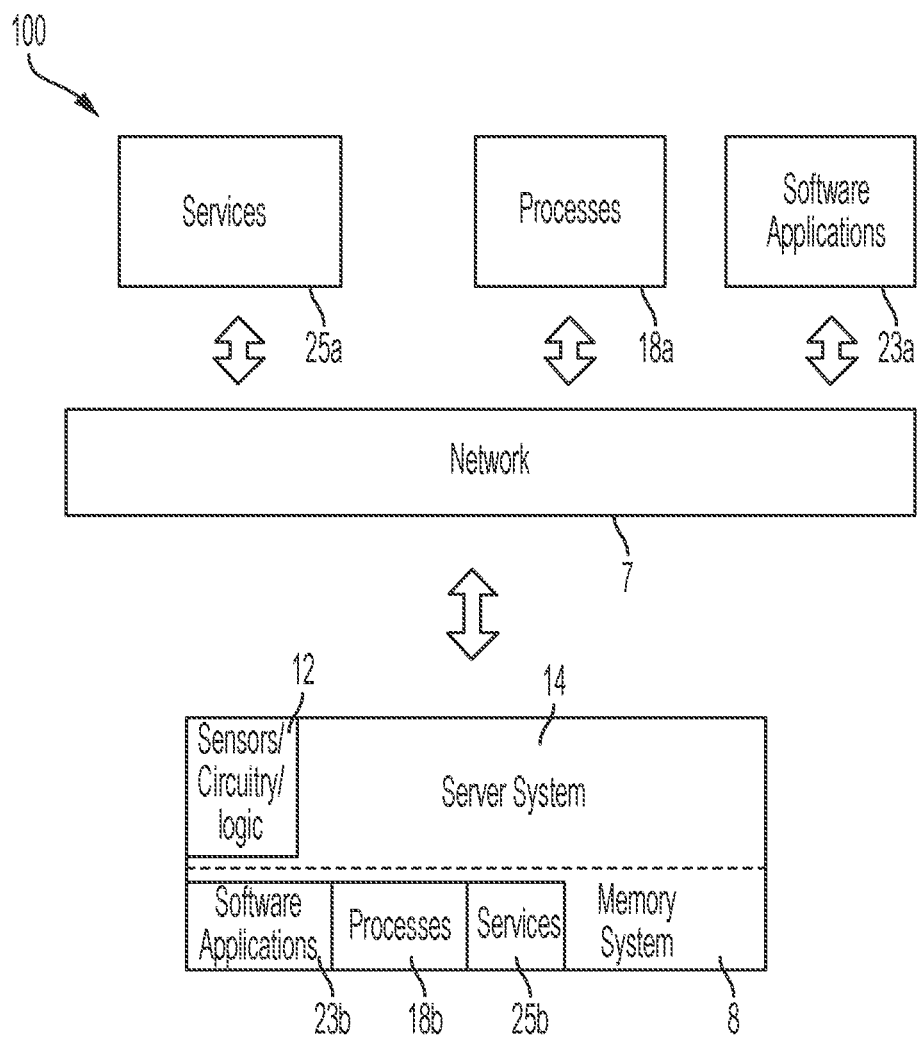
FIG. 1 illustrates a system for improving server system technology associated with initializing server system software, associated processes, and associated services for maintaining server system operation after executing a reboot process, in accordance with embodiments of the present invention.

FIG. 1 illustrates a system 100 for improving server system technology associated with initializing server system software, associated processes, and associated services for maintaining server system operation after executing a reboot process, in accordance with embodiments of the present invention. Typical processes for accurately enabling continuity of system operations include an inaccurate process with little flexibility. Determining operational solutions with respect to system integrity may include a complicated process that may be time consuming and require a large amount of resources. Therefore, system 100 is enabled improve server system technology by providing a continuity of server system services and processes after expected or unexpected server system failures. Providing a continuity of server system services and processes may include generating a snapshot of a server services and processes before and after a server reboot/shutdown process has been executed. System 100 enables the following functionality with respect to initializing server system software:

System 100 detects expected or unexpected failures of a server system (e.g., server system 14 of FIG. 1) and automatically generates a snapshot of server services and processes occurring before and after a reboot/shutdown or failure of the server system. The services and processes being executed before and after a reboot/shutdown or failure of the server system are compared based on the generated snapshot. In response, an administrator is alerted to enable continuity of system services and processes based on a determination of differences between services and processes executing before and after the reboot/shutdown or failure of the server system. System 100 further enables option for transmitting a delta (indicating the aforementioned differences) to the administrator via email, chat, etc. Additionally, a script may be generated for automatic execution during a predetermined reboot process for detecting a status for each process and service (e.g., running, stop, idle, staging) prior to executing the reboot process. An additional script may be executed for determining a delta with respect to each status for each process/service (e.g., running, stop, idle, staging) and/or detecting a faulty or missing processes and services.

System 100 allows user to enable required/desired services in a timely manner after a server crash, reboot, or downtime process has occurred. Additionally, a server system may be managed by two differing entities associated with two differing entity types associated with differing operational goals such as, inter alia, operating system operation, service operation, etc. For example: a software/data owner entity (first entity) expecting a server to always runs associated applications and a system administrator entity (a second and differing entity) that manages an operating system of the server and is not aware of applications, services, and processes currently running on the server. System 100 enables the following improvements to server system technology:

1. Avoidance of any major server system incidents due to an undetected inoperative state of critical server services after a server reboot/crash or downtime (expected or un-expected).

2. Transmission of an alert (e.g., to a system administrator) indicating that a server has been rebooted via an automatic or manual tool (e.g., a patch management tool) without initiating prior running processes and services.

3. Monitoring defined services on a server.

System 100 enables the following implementation for enabling a user A to run a series of server tests on server system 14 via a process ABC:

The process is initiated when user A initiates the series of tests on server 14 via process ABC. Subsequently, the server 14 crashes and a user B (i.e., a system administrator in charge of operation of server 14) restarts server 14 to bring server 14 back on line. However, user B is not aware that process ABC was running prior to the crash and therefore system 100 automatically restarts process ABC based on detection of a pre-generated snapshot of all running processes.

System 100 of FIG. 1 includes a server system 14, services 25a, processes 18a, and software applications 23a interconnected through a network 7. Server system 14 comprises sensors/circuitry/logic 12 and a (specialized) memory system 8. Memory system 8 comprises services 25b, processes 18b, and software applications 23b. Memory system 8 may include a single memory system. Alternatively, memory system 8 may include a plurality of memory systems. Services 25a, processes 18a, and software applications 23a may comprise same or differing services, processes, and software applications from services 25b, processes 18a, and software applications 23a. Server system 14 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server system 14 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving server system technology associated with initializing server system software, associated processes, and associated services for maintaining server system operation after executing a reboot process. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following process for maintaining continuity of system services and processes after a system reboot process has occurred:

The process is initiated when a server system is configured for a reboot or a shutdown. In response, it is determined if a first list of desired processes and services configured for running on the server system is equal to a second list of current processes and services running on the server system. If it is determined that the first list is not equal to the second list, an alert is generated. The alert comprises actions including displaying a difference between the first list and the second list, logging the difference in a pre-boot log, and transmitting a notification including details of the difference. Additionally, it is determined if the reboot or shutdown will not be executed. If it is determined that the reboot or shutdown will not be executed, a to a shell prompt is initiated. If it is determined if the reboot or shutdown will be executed, then the reboot execution is initiated and a third list of current processes and services running on the server as a result of the reboot is received. Subsequently, it is determined if the first list is equal to the second list and third list. If the first, second, and third lists are determined to be equal, then the shell prompt is further executed. If the first, second, and third lists are not determined to be equal, then a second alert is generated. The second alert comprises actions including displaying a difference between the first list, the second list, and the third list, logging the difference in a post-boot log, and transmitting a notification including details of the difference. Additionally, in response to receiving a positive response to a prompt for starting a service identified in the second alert, the service is initiated.

Figure 2:
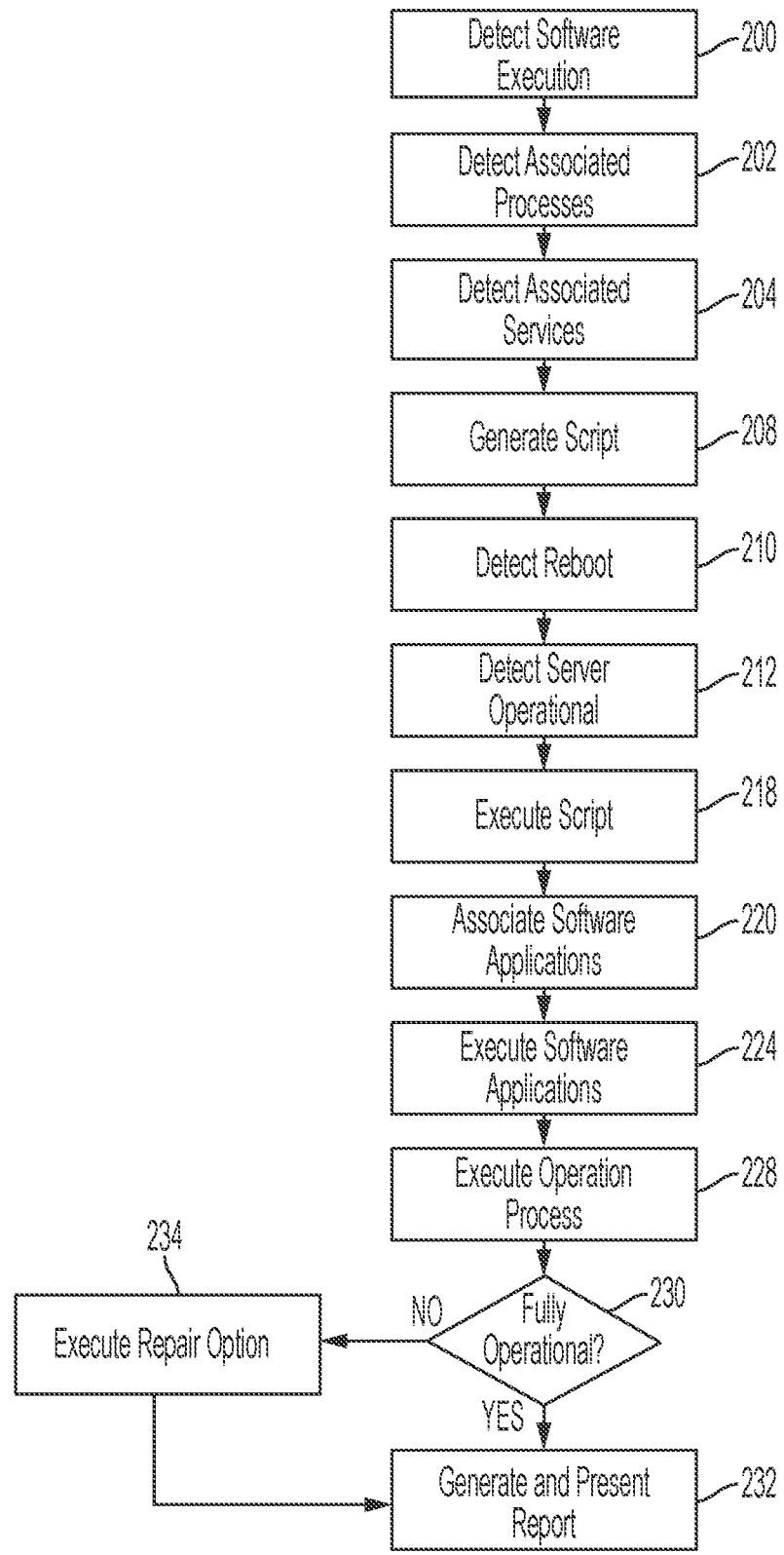
FIG. 2 illustrates an algorithm detailing a process flow enabled by the system of FIG. 1 for improving server system technology associated with initializing server system software, associated processes, and associated services for maintaining server system operation after executing a reboot process, in accordance with embodiments of the present invention.

FIG. 2 illustrates an algorithm detailing a process flow enabled by system 100 of FIG. 1 for improving server system technology associated with initializing server system software, associated processes, and associated services for maintaining server system operation after executing a reboot process, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server system 14, services 25a, processes 18a, and software applications 23a of FIG. 1. In step 200, software applications being currently executed via a server system are detected. In step 202, processes associated with a functionality of the software applications currently running via the server system are detected. In step 204, services associated with a functionality of the software applications currently running via the server system are detected. In step 208, a script describing the software applications, processes, and services is generated. In step 210, the server system executing a reboot process is detected via sensors. The reboot process may include a planned reboot process associated with executing a system maintenance process with respect to the server system. The system maintenance process may include a process such as, inter alia, a software reload process, a hardware replacement process, etc. Alternatively, the reboot process may include an unplanned reboot process associated with repairing a system malfunction of the server system. Repairing the system malfunction of the server system may include: determining that malicious code has infiltrated the server; and removing the malicious code from the server system thereby improving an operation of the server system.

In step 212 (after executing the reboot process), it is detected (via the sensors) that the server system is currently operational (i.e., has been rebooted). In step 218, the script is executed. In step 220, each software application is associated with associated processes and services in response to step 218. In step 224, each software application is executed with each associated process and service. In step 230, it is detected if each software application is fully operational. If in step 230 it is detected that each software application is fully operational then in step 232, a report indicating that each said software application is fully operational is generated and presented via a graphical user interface. If in step 230 it is detected that at least one software application is not fully operational then in step 234, a repair option process associated with the server system is initiated and step 232 is executed. The repair option process may include the following process configurations:

A first process configuration includes detecting that an associated process and/or an associated service is not operational and initializing the associated process and/or associated service to a specified operational state associated with operation of the associated process and/or an associated service before executing the reboot process. Subsequently, the system detects that the at least one software application is fully operational. A second process configuration includes detecting that all processes associated with the least one software application are operational and in response, initializing the at least one software application. Subsequently, the system detects that the at least one software application is fully operational. A third process configuration includes detecting that all processes associated with the least one software application are operational and in response the system searches (via a plurality of network connected devices) for at least one replacement software application for the at least one software application. In response to locating a replacement software application, the software application is downloaded and executed resulting in detection that the at least one software application is fully operational. A fourth process configuration includes detecting that a first process associated with the at least one software application is not operational and in response, searching (via a plurality of network connected devices) for at least one replacement process. Subsequently, an executable script for executing the first process is located and downloaded for execution resulting in initiation of the first process and detection that the at least one software application is fully operational. A fifth process configuration includes detecting a hardware malfunction associated with hardware of the server system and locating a technical support entity for repairing the hardware malfunction. The technical support entity is directed to a location of the server system such that the technical support entity travels to the location and repairs the hardware malfunction resulting detection that the at least one software application is fully operational.

Figure 3:
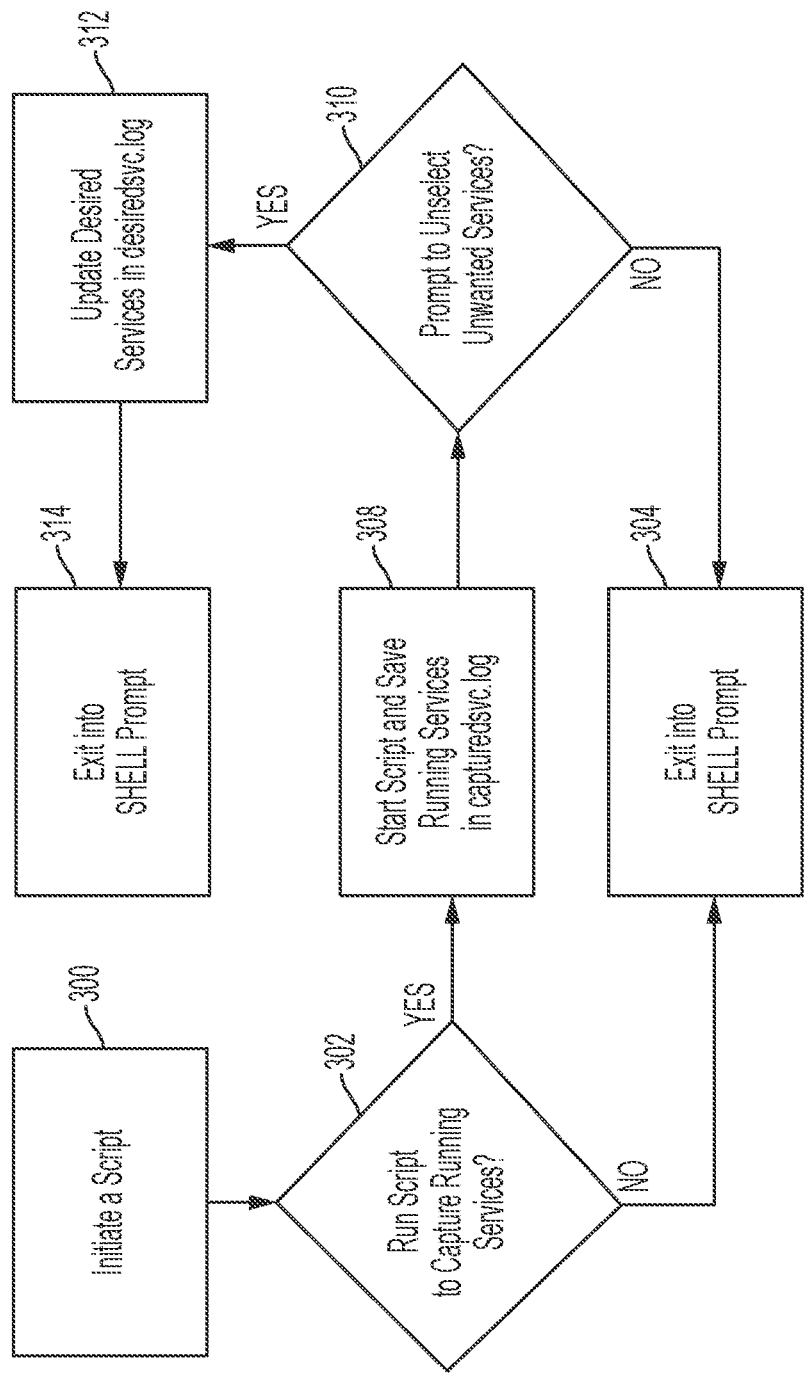
FIG. 3 illustrates a first categorization example of subsystems, services, and processes enabled by the system of FIG. 1 for improving server system technology, in accordance with embodiments of the present invention.

FIG. 3 illustrates a first categorization example of subsystems, services, and processes enabled by system 100 of FIG. 1 for improving server system technology associated with maintaining server system operation after executing a reboot process, in accordance with embodiments of the present invention. The example presented in FIG. 3 is associated with a specified list of processes and services running on a server. In step 300, a script is initiated. In step 302, it is determined if the script will be run to capture associated services. If in step 302, it is determined that the script will not be run to capture associated services then the server system exits into a shell prompt in step 304. If in step 302, it is determined that the script will be run to capture associated services then in step 308, the script is executed at given intervals with respect to a criticality of the server. The script: capturesvc.ksh saves currently running subsystems, services, and processes in an associated log file: capturedsvc.log and the server system is prompted to remove unwanted services in step 310. In step 312, the subsystems, services, and processes are updated within a log: desiredsvc.log and in step 314, the server system exits into a shell prompt.

Figure 4:
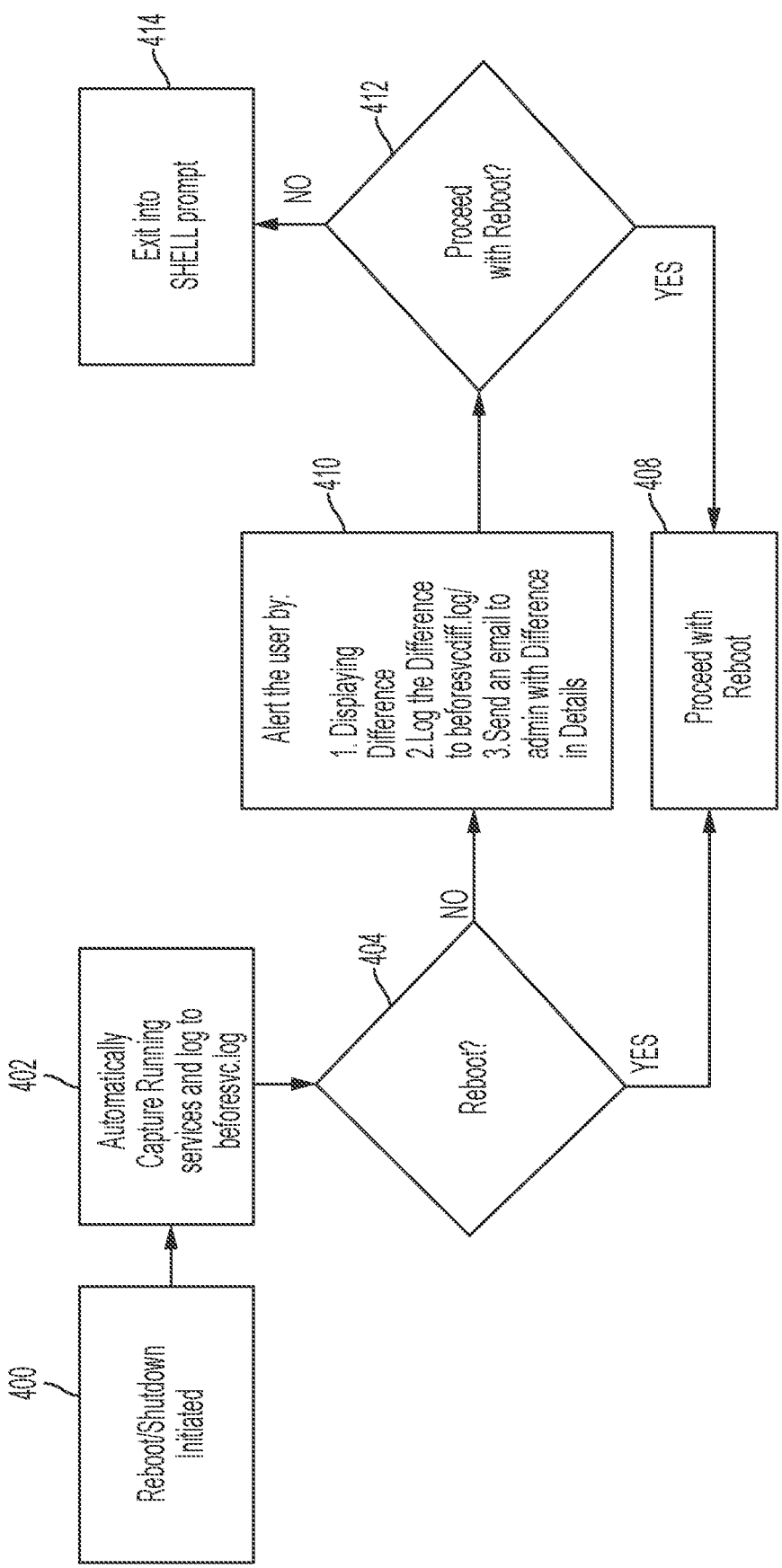
FIG. 4 illustrates a second categorization example of subsystems, services, and processes enabled by the system of FIG. 1 for improving server system technology, in accordance with embodiments of the present invention.

FIG. 4 illustrates a second categorization example of subsystems, services, and processes enabled by system 100 of FIG. 1 for improving server system technology associated with maintaining server system operation after executing a reboot process, in accordance with embodiments of the present invention. The example presented in FIG. 3 is associated with a specified list of processes and services running on a server prior to a reboot/shutdown process (of a server) being executed. In step 400, a reboot/shutdown process is initiated. In step 402, the specified list of processes and services are captured and logged (to a script: beforesvc.ksh) automatically after initiating a reboot or shutdown command. In step 404, it is determined if the reboot/shutdown process should be executed. If in step 404, it is determined that the reboot/shutdown process should be executed then in step 408, the reboot/shutdown process is executed. If in step 404, it is determined that the reboot/shutdown process should not be currently executed then in step 410, a difference between processes and services is displayed, logged (in a log file: beforesvcdiff.log), and transmitted to an administrator via an email. In step 412, it is determined if the reboot/shutdown process should be executed. If in step 412, it is determined that the reboot/shutdown process should be executed then in step 408, the reboot/shutdown process is executed. If in step 412, it is determined that the reboot/shutdown process should not be currently executed then in step 414, the server system exits into a shell prompt.

Figure 5:
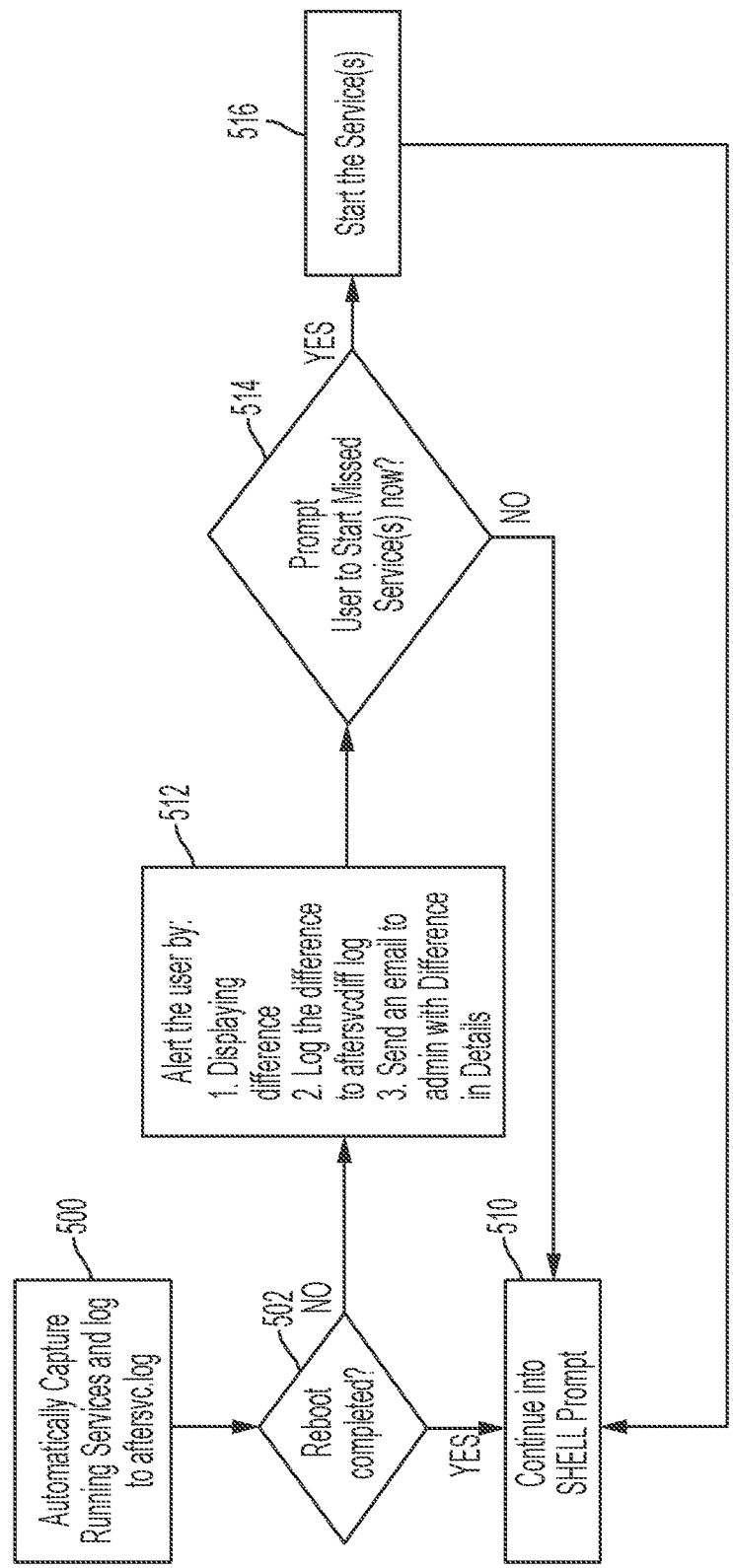
FIG. 5 illustrates a third categorization example of subsystems, services, and processes enabled by the system of FIG. 1 for improving server system technology, in accordance with embodiments of the present invention.

FIG. 5 illustrates a third categorization example of subsystems, services, and processes enabled by system 100 of FIG. 1 for improving server system technology associated with maintaining server system operation after executing a reboot process, in accordance with embodiments of the present invention. The example presented in FIG. 3 is associated with a list of running services after a reboot process (of a server system) has been executed. In step 500, the list of running services is captured and logged automatically (in log: aftersvc.log) after the server comes online. In step 502, it is determined if the reboot process has been completed. If in step 502, it is determined that the reboot process has been completed then in step 510, the server system exits into a shell prompt. If in step 502, it is determined that the reboot process has not been completed then in step 512, a difference between desired and current services and processes is displayed, logged (in a log file: aftersvcdiff.log), and transmitted to an administrator via an email. In step 514, a user is prompted to initiate a missed service. If the user does not initiate the missed service then in step 510, the server system exits into a shell prompt. If the user does initiate the missed service then in step 516, the service is started.

Figure 6:
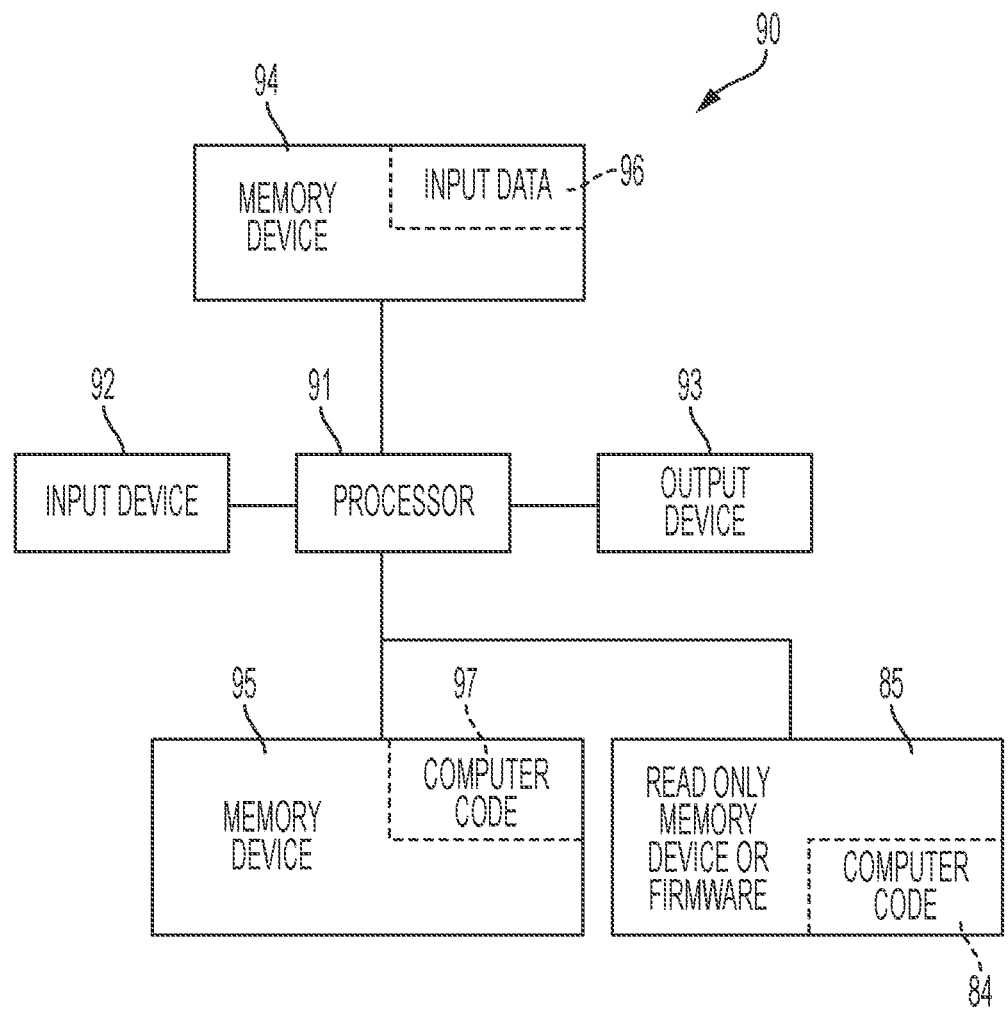
FIG. 6 illustrates a computer system used by the system of FIG. 1 for improving server system technology associated with initializing server system software, associated processes, and associated services for maintaining server system operation after executing a reboot process, in accordance with embodiments of the present invention.

FIG. 6 illustrates a computer system 90 (e.g., server system 14 of FIG. 1) used by or comprised by the system of FIG. 1 for improving server system technology associated with initializing server system software, associated processes, and associated services for maintaining server system operation after executing a reboot process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for improving server system technology associated with initializing server system software, associated processes, and associated services for maintaining server system operation after executing a reboot process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2-5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve server system technology associated with initializing server system software, associated processes, and associated services for maintaining server system operation after executing a reboot process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving server system technology associated with initializing server system software, associated processes, and associated services for maintaining server system operation after executing a reboot process. In another embodiment, the invention provides a business method that performs the process steps of the invention on a subscription, advertising, and/or fee basis. That is, a service supplier, such as a Solution Integrator, could offer to enable a process for improving server system technology associated with initializing server system software, associated processes, and associated services for maintaining server system operation after executing a reboot process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
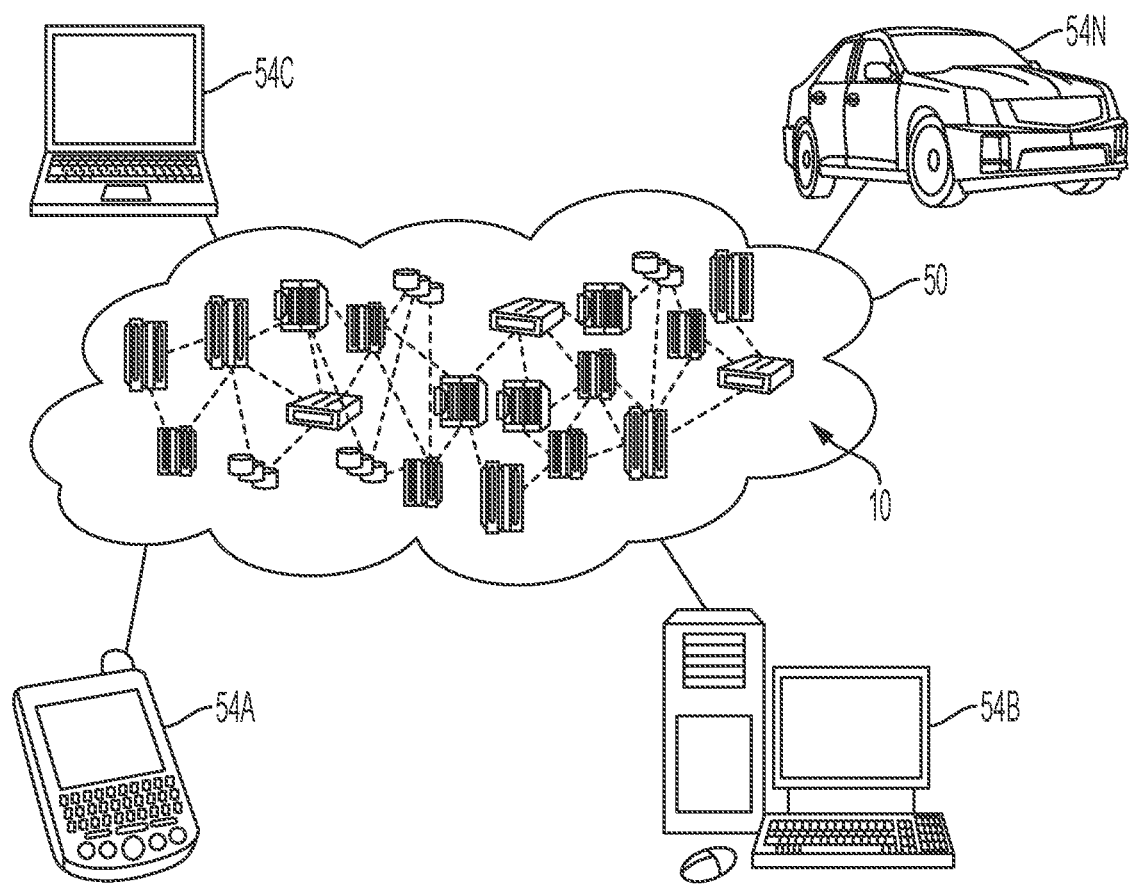
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
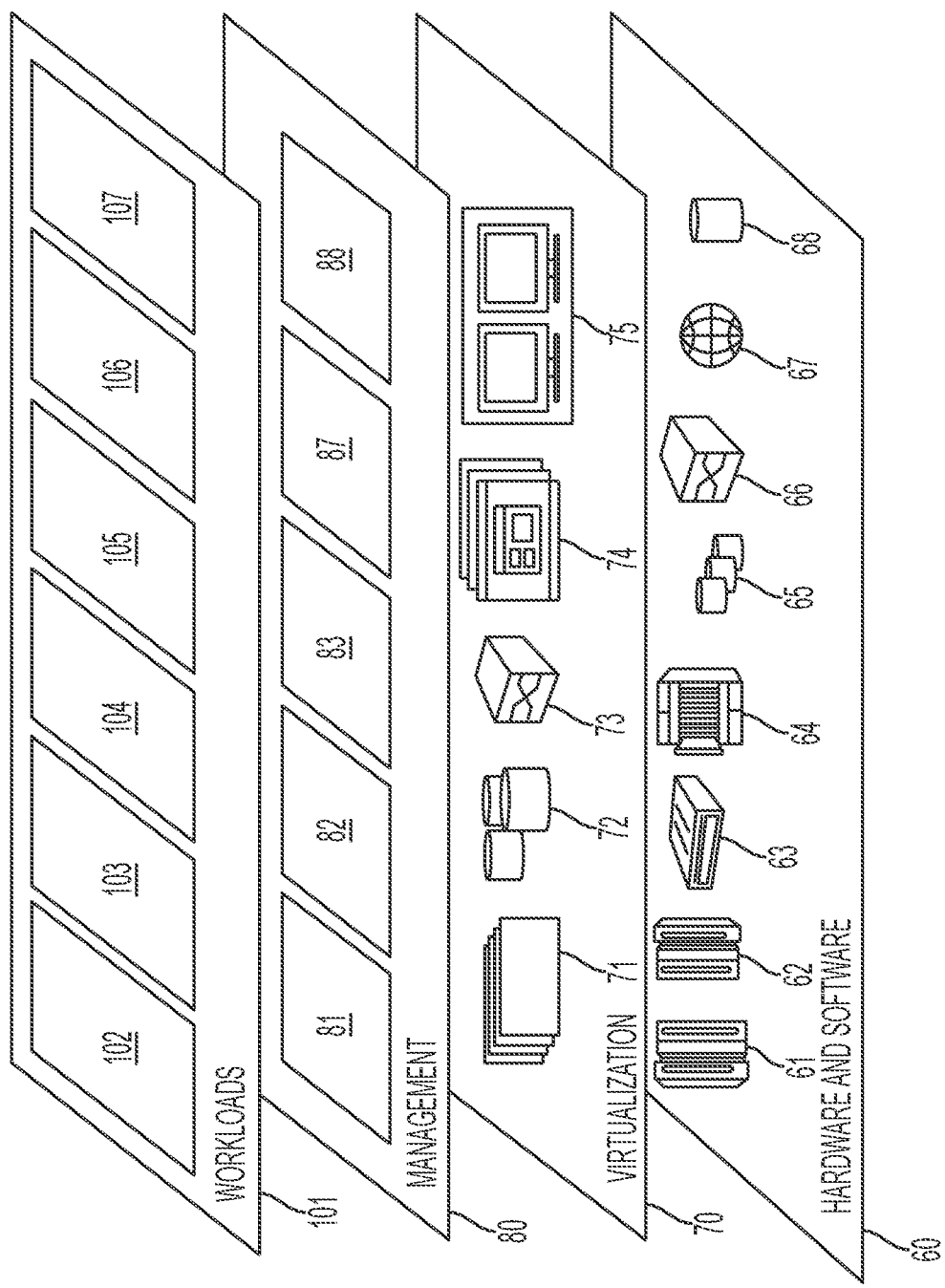
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving server system technology associated with initializing server system software, associated processes, and associated services for maintaining server system operation after executing a reboot process 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system maintenance method comprising:
    detecting, by a processor of a server system, a plurality of software applications being currently executed via said server system;
    detecting, by said processor, a plurality of processes, associated with a functionality of said plurality of software applications, currently running via said server system;
    detecting, by said processor, a plurality of services associated with said functionality of said plurality of software applications, currently running via said server system;
    generating, by said server system, a script describing said plurality of software applications, said plurality of processes, and said plurality of services;
    detecting, by said processor via a plurality of sensors, said server system executing a reboot process;
    after said executing said reboot process, detecting, by said processor via said plurality of sensors, that said server system is currently operational;
    executing, by said processor, said script;
    associating, by said processor based on said executing said script, each software application of said plurality of software applications with associated processes of said plurality of processes and associated services of said plurality of services;
    executing, by said processor, each said software application with each process of said associated processes and each service of said associated services;
    detecting, by said processor, if each said software application is fully operational; and
    executing, by said processor based on results of said detecting if each said software application is fully operational, an operation process associated with said server system.

2. The method of claim 1, wherein said results of said detecting if each said software application is fully operational indicate that each said software application is fully operational, and wherein said operation process comprises:
    generating a report indicating that each said software application is fully operational; and
    presenting, via a graphical user interface, said report.

3. The method of claim 1, wherein said results of said detecting if each said software application is fully operational indicate that at least one software application of said plurality of software applications is not fully operational, and wherein said operation process executes a repair option process comprising:
    detecting that at least one associated process of said plurality of processes is not operational;
    initializing said least one associated process to a specified operational state associated with operation of said least one associated process occurring before said executing said reboot process;
    detecting that at least one associated service of said plurality of services is not operational;
    initializing said at least one associated service to a specified operational state associated with operation of said at least one associated service occurring before said executing said reboot process; and
    detecting that said at least one software application is fully operational.

4. The method of claim 1, wherein said results of said detecting if each said software application is fully operational indicate that at least one software application of said plurality of software applications is not fully operational, and wherein said operation process executes a repair option process comprising:
  detecting that all processes, of said plurality of processes, associated with said at least one software application are operational;
  initializing said at least one software application; and
  detecting that said at least one software application is fully operational.

5. The method of claim 1, wherein said results of said detecting if each said software application is fully operational indicate that at least one software application of said plurality of software applications is not fully operational, and wherein said operation process executes a repair option process comprising:
  detecting that all processes, of said plurality of processes, associated with said at least one software application are operational;
  searching, via a plurality of network connected devices, for at least one replacement software application for said at least one software application;
  locating, within a device of said network connected devices, said at least one replacement software application;
  downloading said at least one replacement software application;
  executing said at least one replacement software application; and
  detecting that said at least one replacement software application is fully operational.

6. The method of claim 1, wherein said results of said detecting if each said software application is fully operational indicate that at least one software application of said plurality of software applications is not fully operational, and wherein said operation process executes a repair option process comprising:
  detecting that a first process, of said plurality of processes, associated with said at least one software application is not operational;
  searching, via a plurality of network connected devices, for at least one replacement process for said first process;
  locating, within a device of said network connected devices, an executable script for executing said at least one replacement process;
  downloading, from said device, said executable script;
  executing said executable script resulting in execution of said at least one replacement process; and
  detecting that said at least one software application is fully operational.

7. The method of claim 1, wherein said results of said detecting if each said software application is fully operational indicate that at least one software application of said plurality of software applications is not fully operational, and wherein said operation process executes a repair option process comprising:
  detecting a hardware malfunction associated with hardware of said server system;
  locating a technical support entity for repairing said hardware malfunction;
  directing said technical support entity to a location of said server system such that said technical support entity travels to said location and repairs said hardware malfunction; and
  detecting that said at least one software application is fully operational.

8. The method of claim 1, wherein said reboot process comprises a planned reboot process associated with executing a system maintenance process with respect to said server system.

9. The method of claim 8, wherein said executing said system maintenance process comprises a process selected from the group consisting of a software reload process and a hardware replacement process.

10. The method of claim 1, wherein said reboot process comprises an unplanned reboot process associated with repairing a system malfunction of said server system.

11. The method of claim 10, wherein said repairing said system malfunction of said server system comprises:
  determining that malicious code has infiltrated said server; and
  removing said malicious code from said server system thereby improving an operation of said server system.

12. The method of claim 1, further comprising:
  providing at least one support service for at least one of creating, integrating, hosting, maintaining, and deploying computer-readable code in said server system, said code being executed by the processor to implement: said detecting said plurality of software applications, said detecting said plurality of processes, said detecting said plurality of services, said generating, said detecting said server system, said detecting that said server system is currently operational, said executing said script, said associating, said executing each said software application, said detecting if each said software application is fully operational, and said executing said operation process.

13. A computer program product comprising a computer readable hardware storage device storing a computer readable program code, said computer readable program code comprising an algorithm that, when executed by a processor of a server system, implements a system maintenance method, said method comprising:
  detecting, by said processor, a plurality of software applications being currently executed via said server system;
  detecting, by said processor, a plurality of processes, associated with a functionality of said plurality of software applications, currently running via said server system;
  detecting, by said processor, a plurality of services associated with said functionality of said plurality of software applications, currently running via said server system;
  generating, by said server system, a script describing said plurality of software applications, said plurality of processes, and said plurality of services;
  detecting, by said processor via a plurality of sensors, said server system executing a reboot process;
  after said executing said reboot process, detecting, by said processor via said plurality of sensors, that said server system is currently operational;
  executing, by said processor, said script;
  associating, by said processor based on said executing said script, each software application of said plurality of software applications with associated processes of said plurality of processes and associated services of said plurality of services;
  executing, by said processor, each said software application with each process of said associated processes and each service of said associated services;
  detecting, by said processor, if each said software application is fully operational; and executing, by said processor based on results of said detecting if each said software application is fully operational, an operation process associated with said server system.

14. The computer program product of claim 13, wherein said results of said detecting if each said software application is fully operational indicate that each said software application is fully operational, and wherein said operation process comprises:
    generating a report indicating that each said software application is fully operational; and
    presenting, via a graphical user interface, said report.

15. The computer program product of claim 13, wherein said results of said detecting if each said software application is fully operational indicate that at least one software application of said plurality of software applications is not fully operational, and wherein said operation process executes a repair option process comprising:
    detecting that at least one associated process of said plurality of processes is not operational;
    initializing said least one associated process to a specified operational state associated with operation of said least one associated process occurring before said executing said reboot process;
    detecting that at least one associated service of said plurality of services is not operational;
    initializing said at least one associated service to a specified operational state associated with operation of said at least one associated service occurring before said executing said reboot process; and
    detecting that said at least one software application is fully operational.

16. The computer program product of claim 13, wherein said results of said detecting if each said software application is fully operational indicate that at least one software application of said plurality of software applications is not fully operational, and wherein said operation process executes a repair option process comprising:
    detecting that all processes, of said plurality of processes, associated with said at least one software application are operational;
    initializing said at least one software application; and
    detecting that said at least one software application is fully operational.

17. The computer program product of claim 13, wherein said results of said detecting if each said software application is fully operational indicate that at least one software application of said plurality of software applications is not fully operational, and wherein said operation process executes a repair option process comprising:
    detecting that all processes, of said plurality of processes, associated with said at least one software application are operational;
    searching, via a plurality of network connected devices, for at least one replacement software application for said at least one software application;
    locating, within a device of said network connected devices, said at least one replacement software application;
    downloading, from said device, said at least one replacement software application;
    executing said at least one replacement software application; and
    detecting that said at least one replacement software application is fully operational.

18. The computer program product of claim 13, wherein said results of said detecting if each said software application is fully operational indicate that at least one software application of said plurality of software applications is not fully operational, and wherein said operation process executes a repair option process comprising:
    detecting that a first process, of said plurality of processes, associated with said at least one software application is not operational;
    searching, via a plurality of network connected devices, for at least one replacement process for said first process;
    locating, within a device of said network connected devices, an executable script for executing said at least one replacement process;
    downloading, from said device, said executable script;
    executing said executable script resulting in execution of said at least one replacement process; and
    detecting that said at least one software application is fully operational.

19. The computer program product of claim 13, wherein said results of said detecting if each said software application is fully operational indicate that at least one software application of said plurality of software applications is not fully operational, and wherein said operation process executes a repair option process comprising:
    detecting a hardware malfunction associated with hardware of said server system;
    locating a technical support entity for repairing said hardware malfunction;
    directing said technical support entity to a location of said server system such that said technical support entity travels to said location and repairs said hardware malfunction; and
    detecting that said at least one software application is fully operational.

20. A server system comprising a processor coupled to a computer-readable memory unit, said memory unit comprising instructions that, when executed by the processor, implement a system maintenance method comprising:
    detecting, by said processor, a plurality of software applications being currently executed via said server system;
    detecting, by said processor, a plurality of processes, associated with a functionality of said plurality of software applications, currently running via said server system;
    detecting, by said processor, a plurality of services associated with said functionality of said plurality of software applications, currently running via said server system;
    generating, by said server system, a script describing said plurality of software applications, said plurality of processes, and said plurality of services;
    detecting, by said processor via a plurality of sensors, said server system executing a reboot process;
    after said executing said reboot process, detecting, by said processor via said plurality of sensors, that said server system is currently operational;
    executing, by said processor, said script;
    associating, by said processor based on said executing said script, each software application of said plurality of software applications with associated processes of said plurality of processes and associated services of said plurality of services;
    executing, by said processor, each said software application with each process of said associated processes and each service of said associated services;
    detecting, by said processor, if each said software application is fully operational; and executing, by said processor based on results of said detecting if each said software application is fully operational, an operation process associated with said server system.

* * * * *